(12) United States Patent
Walbert

(10) Patent No.: US 9,805,578 B2
(45) Date of Patent: Oct. 31, 2017

(54) ALERT SYSTEM FOR DETECTING RISING WATER LEVELS

(71) Applicant: Belinda J. Walbert, Park Hills, MO (US)

(72) Inventor: Belinda J. Walbert, Park Hills, MO (US)

(*) Notice: Subject to any disclaimer, the term of this patent is extended or adjusted under 35 U.S.C. 154(b) by 0 days.

(21) Appl. No.: 15/383,874

(22) Filed: Dec. 19, 2016

(65) Prior Publication Data

US 2017/0098362 A1    Apr. 6, 2017

Related U.S. Application Data

(63) Continuation of application No. 14/869,288, filed on Sep. 29, 2015, now Pat. No. 9,576,463, which is a continuation-in-part of application No. 14/305,627, filed on Jun. 16, 2014, now Pat. No. 9,163,977, which is a continuation of application No. 13/586,565, filed on Aug. 15, 2012, now Pat. No. 8,786,453.

(51) Int. Cl.
| | |
|---|---|
| G08B 21/00 | (2006.01) |
| G08B 21/10 | (2006.01) |
| G08B 21/18 | (2006.01) |

(52) U.S. Cl.
CPC .......... *G08B 21/10* (2013.01); *G08B 21/182* (2013.01)

(58) Field of Classification Search
CPC .......... G08B 21/10; G08B 21/20; G01F 23/64
USPC .................................. 340/618–624
See application file for complete search history.

(56) References Cited

U.S. PATENT DOCUMENTS

| | | | |
|---|---|---|---|
| 2,980,775 A | 4/1961 | Crain | |
| 3,310,795 A | 3/1967 | David | |
| 4,080,985 A | 3/1978 | Eagle | |
| 4,153,881 A | 5/1979 | Permut et al. | |
| 4,757,305 A * | 7/1988 | Peso | G01F 23/60 340/624 |
| 4,800,372 A * | 1/1989 | Poteet | G08B 21/182 340/625 |
| 4,804,947 A | 2/1989 | Geleziunas | |
| 4,879,545 A * | 11/1989 | Aguilar | G08B 21/084 340/624 |
| 4,973,947 A | 11/1990 | Tax | |
| 5,083,956 A | 1/1992 | Chraghchian et al. | |
| 5,151,685 A | 9/1992 | Spicer et al. | |
| 5,199,813 A * | 4/1993 | Nagler | E01F 9/654 404/9 |
| 5,283,569 A * | 2/1994 | Nelson | H04M 11/04 340/623 |
| 5,781,117 A * | 7/1998 | Rish | G01F 23/36 340/623 |
| 5,862,775 A | 1/1999 | Stroud | |
| 6,480,113 B1 | 11/2002 | Esposito | |
| 6,558,216 B2 | 5/2003 | Yerazunis et al. | |
| 6,786,091 B1 | 9/2004 | Aleali | |

(Continued)

FOREIGN PATENT DOCUMENTS

CN    201402170    2/2010

*Primary Examiner* — Eric M Blount
(74) *Attorney, Agent, or Firm* — Lewis Rice LLC

(57) ABSTRACT

A portable, self-contained flood alarm which alleviates the shortcomings of the alarms of the prior art and offers an easy-to-use and reliable flood and water level alarm which will adequately warn users of potential flood conditions and possibly save their personal belongings, equipment and lives.

15 Claims, 4 Drawing Sheets

(56) References Cited

U.S. PATENT DOCUMENTS

| | | | |
|---|---|---|---|
| 7,068,175 B1 * | 6/2006 | Pennington | G01F 23/66 340/450 |
| 7,417,552 B1 | 8/2008 | Vaskovic | |
| 7,418,861 B2 | 9/2008 | Fling et al. | |
| 8,339,269 B2 | 12/2012 | Sherron | |
| 2005/0099311 A1 | 5/2005 | Eskins | |
| 2005/0109104 A1 | 5/2005 | Fling et al. | |

* cited by examiner

ALERT SYSTEM FOR DETECTING RISING WATER LEVELS

CROSS REFERENCE TO RELATED APPLICATION(S)

This Application is a Continuation of U.S. Utility patent application Ser. No. 14/869,288 filed on Sep. 29, 2015, which is in turn a Continuation-In-Part (CIP) of U.S. Utility patent application Ser. No. 14/305,627, filed Jun. 16, 2014 and now U.S. Pat. No. 9,163,977 which is in turn a Continuation of U.S. Utility patent application Ser. No. 13/586,565, filed Aug. 15, 2012 and now U.S. Pat. No. 8,786,453. The entire disclosure of all the above references is herein incorporated by reference.

BACKGROUND OF THE INVENTION

1. Field of the Invention

This disclosure is related to the field of water level alert and flood detector systems. Specifically, this disclosure is related to simple, lightweight, portable water level detectors that can be permanently or removeably attached to any surface or terrain, the system providing a warning should the water reach a predetermined and potentially dangerous level.

2. Description of Related Art

There are few places on Earth where people need not be concerned about flooding. Any place where rain falls is vulnerable, although rainfall is not the only cause of flooding. Floods and the water damage caused by flooding are among the most frequent and costly natural disasters and can develop in a myriad of different ways. One common way floods occur is when rivers or streams overflow their banks from excessive rain, a ruptured dam or levee, or rapid ice melt. warning. These flash floods can be extremely dangerous, and often are marked by a dangerous wall of roaring water carrying rocks, mud and other debris.

The moving water which results from floods has awesome destructive power. Usually structures are poorly equipped to withstand flood water's strength. In extreme cases, bridges, houses, trees and cars can be picked up and carried off, personal possessions and property can be destroyed, and even animals and individuals can be harmed. For example, in the United States floods do approximately about 6 billion dollars' worth of damage and kill about 140 people every year.

Because of the danger to lives and property posed by flooding, there is a need for a simple, lightweight, portable flood alert and alarm system that can activate a warning means to notify an individual prior to a potentially disastrous or dangerous flood. Such an alarm system would give individuals sufficient warning to vacate a potentially dangerous flood area and move their personal possessions and property to a safer and more secure area. Stated differently, there is a need for a portable device that can be moved and utilized in homes, on camping trips, or at any location where there is a possibility of flooding so that individuals in the area of the potential flood can be warned within a sufficient amount of time so as to protect and move themselves and their valuables.

While there are a number of devices available for warning of the onset of a flood in areas prone to flooding, many of these devices are problematic. First, many of these devices are not lightweight or easily portable. Accordingly, it can be cumbersome and unwieldy to transport and place the detectors in at-risk flood areas. In addition, many of these devices are expensive and/or have a complex structure that is difficult to understand, set-up, and program. Another problem with these devices currently utilized in the art is that they often malfunction. Many of these devices are float-based systems. Typically, these float systems detect a rising level of water, or some other liquid, and sound an alarm to alert others of the rising liquid condition. In some of these systems, the buoyant floats contain a sensor which, when raised or otherwise moved by the presence of flood water, closes an electrical circuit when it reaches a certain predefined point, thereby engaging the alarm. The problems with these sensor float activated systems can be numerous. First, water present in the flood situation can impair or short circuit the electrical circuit. In these situations, even if the float is raised and an alarm should be triggered, no alarm will sound because the circuit will not be completed. This damage generally renders the device useless. Second, in addition to water damage, debris or other detritus in the flood water can become stuck to the float or the circuit. This debris can catch the float, preventing it from moving with the rising flood waters, or it can become caught in the sensor or circuit, preventing a complete connection and sounding of the alarm. Finally, many of these systems are either constructed to alert for gradual flooding or flash flooding, they do not adequately monitor and alert a user to either type of flooding. Thus, these currently utilized systems are susceptible to damage and being put out of commission by excessive flooding.

Accordingly, there is a need for the development of a portable, self-contained flood alarm which alleviates the shortcomings of the alarms of the prior art and offers an easy-to-use and reliable flood and water level alarm which will adequately warn users of potential flood conditions and possibly save their personal belongings, equipment, and lives. The device and system disclosed herein achieves its intended purposes, objectives, and advantages over the prior art through a new, useful, and nonobvious combination of component elements, which is simple to use, contains a minimum number of functioning parts, is economical to manufacture and assemble, and is not as susceptible to the problems inherent to the structure and design of the flood warning systems of the prior art.

SUMMARY OF THE INVENTION

Because of these and other problems in the art, described herein, among other things, is a portable, self-contained flood alarm which alleviates the shortcomings of the alarms of the prior art and offers an easy-to-use and reliable flood and water level alarm which will adequately warn users of potential flood conditions and possibly save their personal belongings, equipment, and lives.

In an embodiment disclosed herein, the self-contained flood alarm is comprised of an alert device for detecting rising water levels, the alert device comprising: a weighted base plate; a main body having an anterior end and a posterior end, a length therebetween and a hollow interior, the posterior end of the main body being attached to the base plate and positioned approximately vertically therefrom; a stabilizing rod having an anterior end and a posterior end and a length therebetween, the posterior end of the stabilizing rod being attached to the base plate and extending approximately vertically therefrom into the interior of the main body; a float, the float being moveably attached to the stabilizing rod smaller in diameter than the main body; a water level rod having an anterior end and a posterior end and a length therebetween, the float being attached to the water level rod at or near its posterior end and the water level rod extending approximately vertically therefrom into the interior of the main body; and an alarm assembly located at or within the anterior end of the main body, the alarm assembly having an activation mechanism.

In an embodiment of the alert device it is contemplated that the main body is perforated.

In an embodiment of the alert device, it is contemplated that the anterior end of the main body will be attached to the base plate via an attachment methodology that creates a space between the posterior end of the main body and the base plate, thereby allowing for rising flood waters to enter and leave the hollow interior of the main body.

In an embodiment of the alert device, it is contemplated that the water level rod is adjustably attached to the float.

In an embodiment of the alert device, it is contemplated that the activation mechanism of the alarm assembly will be activated when rising water causes the float and the attached water level rod to rise approximately vertically along the path of the stabilizing rod within the main body until the anterior end of the water level rod comes into contact with the activation mechanism of the alarm assembly, thereby activating the alarm assembly.

In an embodiment, the alert device further comprises at least once PVC coupling, a grate and a cap, wherein the at least one PVC coupling is connected to the posterior end of the main body, the grate is locate within the coupling, the alarm assembly is located within the PVC coupling and the cap seals the interior of the main body and at least one PVC coupling.

In an embodiment of the alarm assembly it is contemplated that the device will be portable. In an embodiment of this portable alarm assembly, it is contemplated that the device will be further comprised of a handle, the handle being located somewhere on the external surface area of the device.

In an embodiment of the alarm assembly, it is contemplated that the assembly will be further comprised of a door in the main body, the door allowing a user access to the hollow interior of the main body.

In an embodiment of the alarm assembly, it is contemplated that the device is permanent.

In another embodiment, there is described herein a method for alerting an individual in a temporary location of rising nearby water levels, the method comprising: providing an alert device, the alert device comprising: a weighted base plate; a handle; a main body having an anterior end and a posterior end, a length therebetween and a hollow interior, the posterior end of the main body being attached to the base plate, and the anterior end of the main body being attached to the handle; a stabilizing rod having an anterior end and a posterior end and a length therebetween, the posterior end of the stabilizing rod being attached to the base plate and extending approximately vertically therefrom into the interior of the main body; a float, the float being moveably attached to the stabilizing rod and smaller in diameter than the main body; a water level rod having an anterior end and a posterior end and a length therebetween, the float being attached to the water level rod at or near its posterior end and the water level rod extending approximately vertically therefrom into the interior of the main body; and an alarm assembly located at or within the anterior end of the main body, the alarm assembly having an activation mechanism; carrying the alert device to a temporary location proximate a body of water using the handle; placing the alert device in the temporary location by lowering the alert device onto the weighted base using the handle; and leaving the alert device resting in the temporary location.

In an embodiment of the method, the main body of the alert device is perforated.

In an embodiment, the method further comprises attaching the anterior end of the main body to the base plate via an attachment methodology that creates a space between the posterior end of the main body and the base plate; and placing the alert device in the temporary location so that water in the body of water does not enter the space unless the body of water has an increase in water level.

In an embodiment of the method, the water level rod of the alert device is adjustably attached to the float.

There is also described herein, an alert device for detecting rising water levels, the alert device comprising: a weighted base plate; a main body having an anterior end and a posterior end, a length therebetween and a hollow interior, the posterior end of the main body being attached to the base plate and positioned approximately vertically therefrom; a stabilizing rod having an anterior end and a posterior end and a length therebetween, the posterior end of the stabilizing rod being attached to the base plate and extending approximately vertically therefrom into the interior of the main body; a float, the float being moveably attached to the stabilizing rod smaller in diameter than the main body; a water level rod having an anterior end and a posterior end and a length therebetween, the float being attached to the water level rod at or near its posterior end and the water level rod extending approximately vertically therefrom into the interior of the main body; and an alarm assembly located at or within the anterior end of the main body, the alarm assembly having an activation mechanism; wherein the activation mechanism of the alarm assembly is activated when rising water causes the float and the attached water level rod to rise approximately vertically along the path of the stabilizing rod within the main body until the anterior end of the water level rod comes into contact with the activation mechanism of the alarm assembly, thereby activating the alarm assembly; and wherein when the activation mechanism is activated, the activation mechanism triggers an alarm at a location remote from the alert device.

In an embodiment of the alert device, the main body is perforated.

In an embodiment of the alert device, the anterior end of the main body is attached to the base plate via an attachment methodology that creates a space between the posterior end of the main body and the base plate, thereby allowing for rising flood waters to enter and leave the hollow interior of the main body.

In an embodiment of the alert device, the water level rod is adjustably attached to the float.

In an embodiment of the alert device, the device is portable.

In an embodiment of the alert device, the device is further comprised of a handle, the handle being located somewhere on the external surface area of the device.

In an embodiment of the alert device, the devised is further comprised of a door in the main body, the door allowing a user access to the hollow interior of the main body.

In an embodiment of the alert device, when the activation mechanism is activated, the activation mechanism sends a text message.

In an embodiment of the alert device, when the activation mechanism is activated, the activation mechanism sends an e-mail message.

In an embodiment of the alert device, when the activation mechanism is activated, the activation mechanism calls a phone number.

In an embodiment of the alert device, when the activation mechanism is activated, the activation mechanism contacts a service company.

In an embodiment of the alert device, when the activation mechanism is activated, the activation mechanism communicates with a mobile device application.

DESCRIPTION OF THE PREFERRED EMBODIMENT(S)

Figure 1:
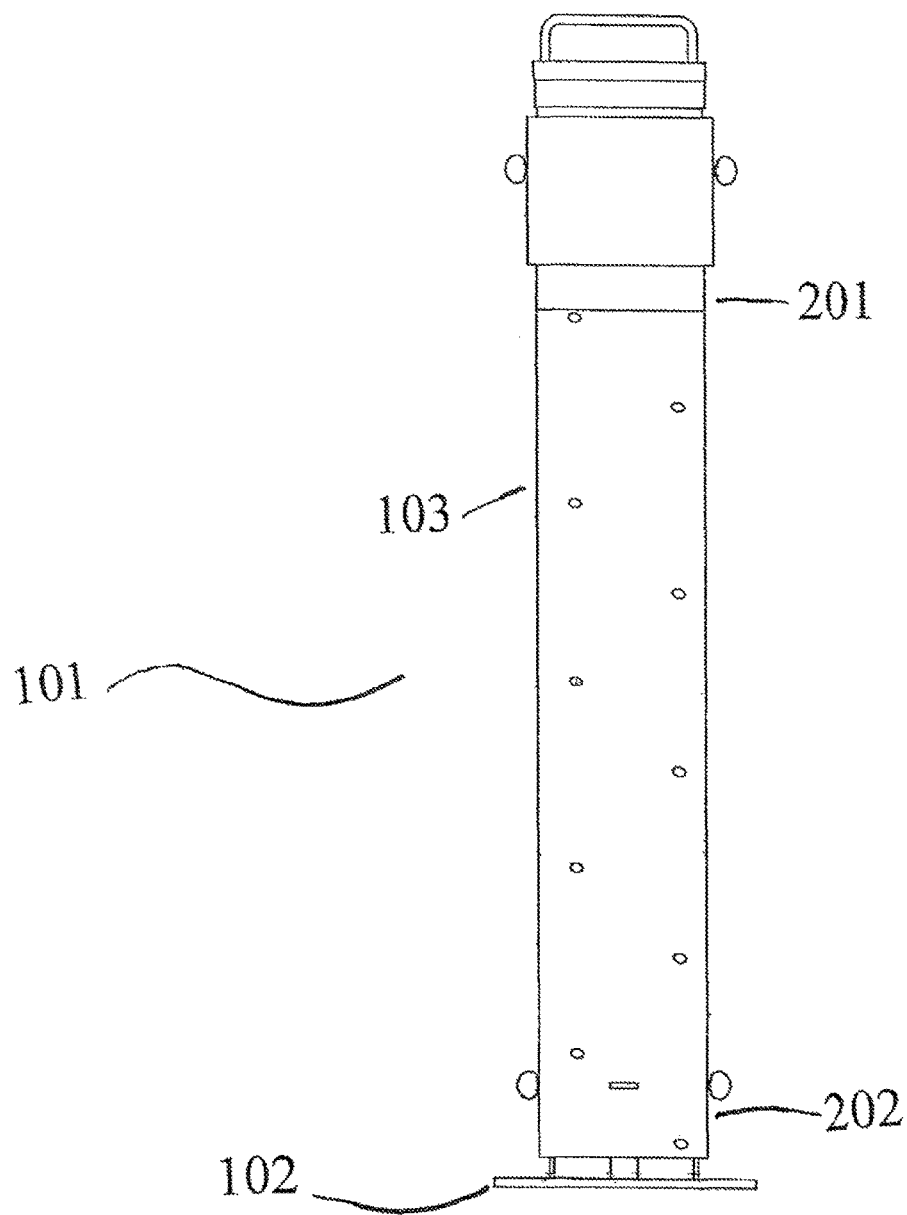
FIG. 1 provides a front perspective view of an embodiment of the small, portable, lightweight flood warning device described herein.
Figure 2:
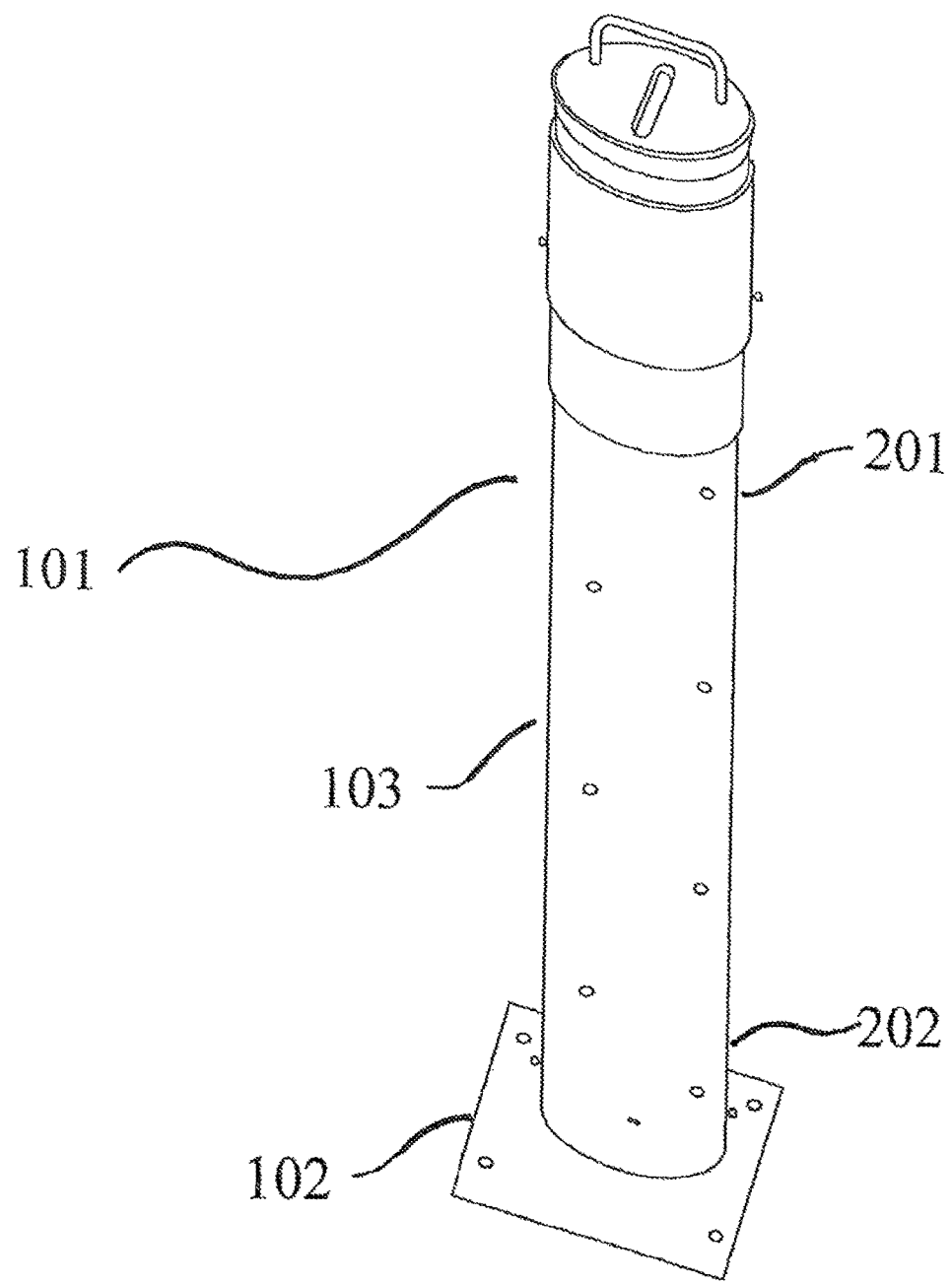
FIG. 2 provides a side perspective view of an embodiment of the small, portable, lightweight flood warning device described herein.
Figure 3:
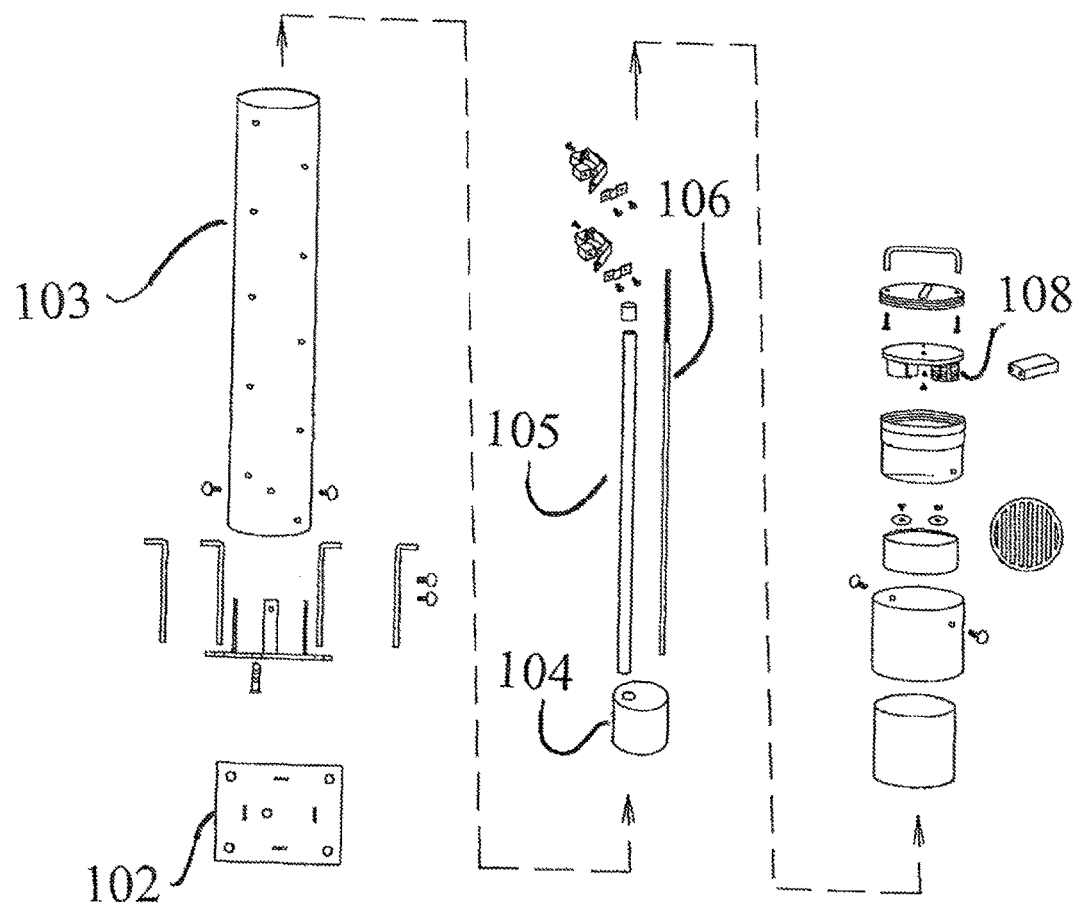
FIG. 3 provides a perspective view of the component parts of an embodiment of the small, portable, lightweight flood warning device described herein.
Figure 4:
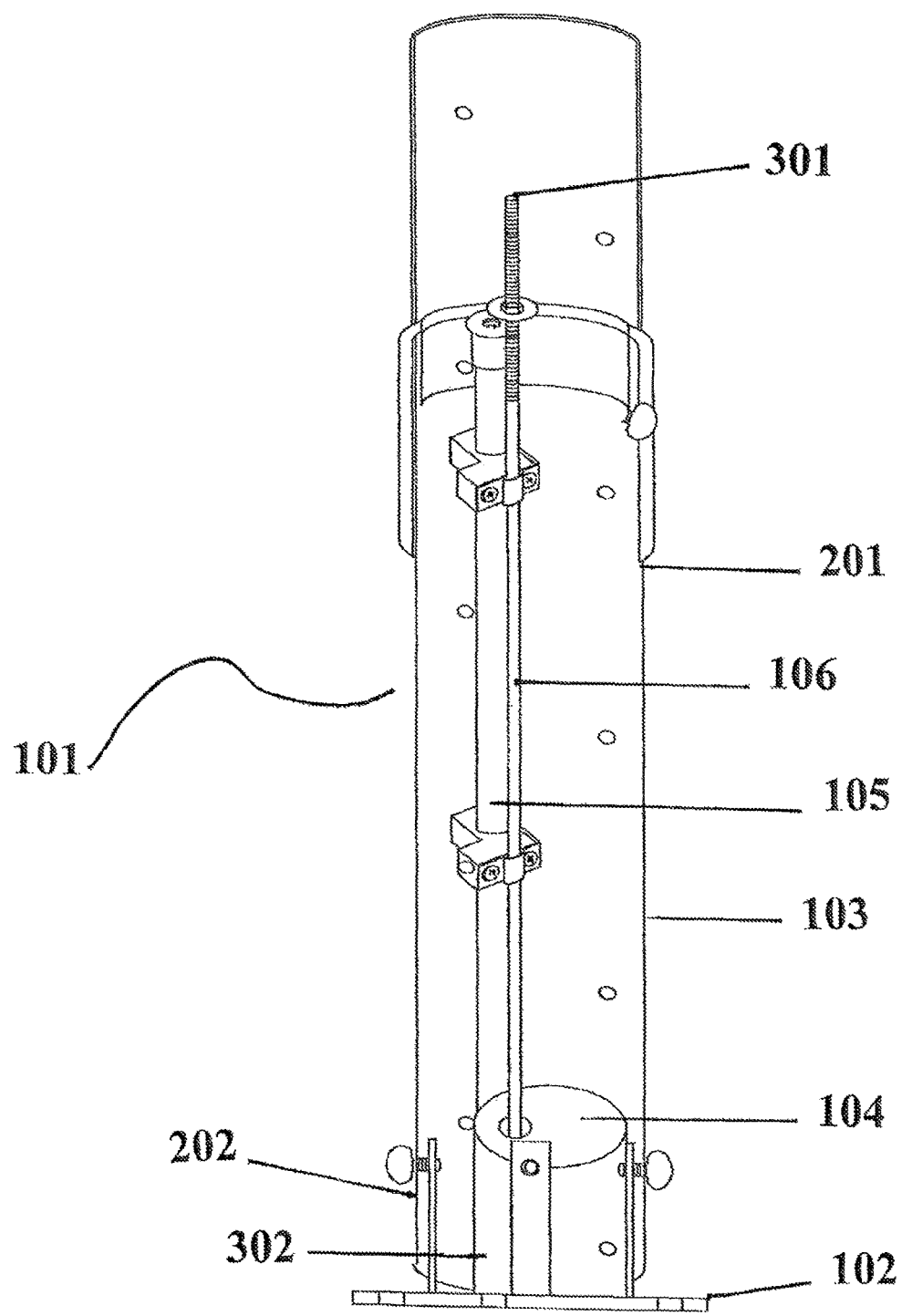
FIG. 4 provides a cut-through view of an embodiment of the small, portable, lightweight flood warning device described herein.

FIG. 1 provides a prospective view of a diagram of an embodiment of the portable rising water alert device described herein. FIG. 4 provides a cut-through of an embodiment of the portable water alert device described herein. As depicted therein, the portable rising water alert device (101) generally consists of the following components: a standing base plate (102); a main body (103); a float (104); a stabilizing rod (105); a water level rod (106); and an alarm assembly (108).

Generally, in a simplified embodiment, the portable rising water alert device (101) is assembled and functions as follows. The main body (103) of the portable rising water alert device (101) is generally any hollow pipe with an anterior end (201) and a posterior end (202) and a length therebetween. It is contemplated that the main body (103) may be comprised of any material known to those of ordinary skill in the art such as metals, plastic, wood, etc. In one embodiment, the main body (103) will be comprised of polyvinyl chloride (PVC). Further, the dimensions of the main body (103) are not determinative. In one embodiment it is generally contemplated that the height of the main body (103) in the permanent version of the device will be taller than the height of the main body (103) in the portable version of the device. For example, in one embodiment the height of the main body (103) in the portable embodiment will be no more than about 24 inches tall and the height of the main body (103) in the stationary embodiment will be no more than about 40 inches tall. Generally, this discrepancy in height will make the shorter main body (103) version generally more portable and easier to carry than the permanent version. Similarly, while the diameter of the main body (103) is not determinative, the diameter will generally be large enough to allow for the free and unobstructed movement of the float (104) in a vertical manner along the water level rod (106) and the stabilizing rod (105) therein. For example, in a preferred embodiment the diameter of the main body (103) will be large enough in diameter to ensure that the edges of the float (104) do not come into contact with the main body (103). In one embodiment, as depicted in FIGS. 1-4, the main body (103) will be about 4 inches in diameter. Moreover, as depicted in FIGS. 1-4, in one embodiment the main body will be perforated. In this embodiment, the perforation will assist in the ingress and egress of liquid into and out of the interior of the main body (103). This embodiment will be particularly helpful in instances of flash flooding by providing for multiple access points for the sudden rush of water to enter and leave the device (101).

As depicted in FIGS. 1-4, the posterior end (202) of the main body (103) will be attached to a base plate (102). The base plate (102), as defined herein, may include any base plate or flat stand known to those of ordinary skill in the art that can act as a stabilizing platform for the main body (103) attached thereto. As such any material (e.g., metal, wood, plastic, etc.) and any shape (e.g., circle, square, rectangle, polygon) is contemplated for the base plate described herein. In a preferred embodiment, the base plate (102) will be weighted. With a weighted base plate (102) the device (101) will not need to be staked down or otherwise attached to the ground to protect it from falling over or becoming otherwise incapacitated during a rush of flood waters. This minimalization of component parts—i.e., the device does not need to be staked down or otherwise attached to the ground to properly function is a benefit in the portable version of the device (101) where simplification of the device (101) is desirable. In one embodiment, as depicted in the FIGS., the base plate will be a square metal base plate that has a larger surface area than the circumference of the main body (103)—i.e., the posterior end (202) of the main body (103) will fit within the surface area of the base plate (102). Generally, any form of attachment, either permanent or temporary, known to those of ordinary skill in the art for attaching a main body (103) to a base plate (102) is contemplated. Such attachment mechanisms include, but are not limited to soldering, screwing, pinning and clipping. For example, in the embodiment depicted in FIGS. 1-4, the main body (103) will be screwed into the base plate (102). This form of attachment of the base plate (102) to the main body (103) creates an easily removable bottom for the device (101). Notably, in a preferred embodiment, as depicted in FIGS. 1-4, the main body (103) is attached to the base plate in such a manner to create an opening or gap in between the base plate (102) and the posterior end (202) of the main body (103) such that rising flood water can enter into and leave the interior hollow space of the main body (103) through this opening. In one embodiment of the base plate (102) depicted in FIGS. 1-4, the base plate (102) will have one or more holes at or near the perimeter of the base plate (102). In this embodiment, a peg or some other form of attaching device will be utilized with the holes to more firmly attach the base plate (102) to the ground or other surface upon which it rests. For example, in the embodiment depicted in FIGS. 1-4, it is contemplated that ground pegs or stakes will be used in conjunction with the base plate (102) to attach the base plate (102) to the ground.

In addition to the main body (103), it is also contemplated that the stabilizing rod (105) will be attached to the base plate (102). The stabilizing rod (105) is a rod attached to the base plate (102) and extending vertically therefrom into the hollow interior of the Main body (103), terminating at a distance at or near the anterior end (201) of the main body (103). The stabilizing rod (105) functions as a stabilizer for the moveable float (104) of the device, defining the path along which the moveable float (104) will travel inside the main body (103). Thus, the stabilizing rod (105) generally prevents the float (104) from turning, wedging or otherwise becoming jammed inside the main body (103)—it allows the float (104) to float freely and stay flat.

Generally, the dimensions of the stabilizing rod are not determinative. Any sized or shaped rod comprised of a material known to those of ordinary skill in the art that can: a) be attached in a manner to the base plate (102); b) can fit inside the length of the main body (103); and c) can be attached to the float (104) so that the float can freely travel its length is contemplated for this device (101). In one embodiment, as depicted in FIGS. 1-4, the stabilizing rod will be comprised of a ¼" inch hollow PVC pipe. Further, any form of attachment, either permanent or temporary, for the stabilizing rod (105) to the base plate (102) is contemplated for the device (101). For example, the stabilizing rod (105) may be soldered, pinned, clipped or screwed into the base plate (102). In the embodiment depicted in FIGS. 1-4, the stabilizing rod (105) is a hollow PVC pipe which is attached to the base plate (102) via a hole in the base plate (102) and an insert plug. Finally, in the embodiment of the stabilizing rod (105) in which the rod is hollow, the terminating end of the stabilizing rod (105) (i.e., the end of the stabilizing rod (105) opposite to the end attached to the base plate (102)) will be topped with a cap or some other plugging methodology.

The float (104) of the device (101) may be comprised of any float (104) mechanism known to those of ordinary skill in the art. Similar to other component parts of the device (101), the dimensions of the float (104) and the materials which comprise the float (104) are not determinative. Generally, the float (104) may be comprised of any material known to those of ordinary skill in the art which will float on top of a rising liquid, specifically water. Further, the dimensions of the float (104) may take any shape so long as the float (104) is able to freely travel within the main body (103) along the length of the stabilizing rod (105) with an influx of rising flood water that comes into the interior of the main body (103) during the time of a flood situation. In a preferred embodiment, the float (104) will not touch the edges of the main body (103)—there will be a space between the float (104) and the main body (103). This preferred embodiment allows for water to flow into the device in a flood situation from both above and below the float (104)—a structure that is extremely desirable in flash flood situations where water rushing into the currently utilized float-based systems in the art can jam the float or otherwise render the device inoperable. For example, in the embodiment depicted in FIGS. 1-4 in which the main body (103) is comprised of a 4 inch diameter pipe, the float (104) may be comprised of circular float device that is generally 2 inches in diameter, creating a 1 inch space between all sides of the float (104) and the main body (103). The float (104) of the device (101) will be attached via a two pole system; i.e., it will be attached to both a stabilizing rod (105) and a water level rod (106). As noted previously in this application, the float (104) will be threadably attached to the stabilizing rod (105) in a manner that allows the float to freely travel the length of the stabilizing rod (105) with the ingress and egress of water into and out of the main body (103). In the embodiment of the device (101) depicted in FIGS. 1-4, the float (104) has a hole through it that is greater in diameter than the diameter of the stabilizing rod (105) and the float (104) is threaded onto the stabilizing rod (105) via this hole. Further, in the embodiment of the device (101) depicted in FIGS. 1-4, the float (104) has a second hole through it for attachment of the water level rod (106) to the float (104). Although the size of these two attachment holes in this embodiment of the float (104) is not determinative, in one embodiment the stabilizing hole will be about 2½ inches and the flexible rod hole will be about ¼ inches.

Another component of the device (101) which is attached to the float (104) is the water level rod (106). The water level rod (106) is a rod with an anterior end (301) and a posterior end (302) and a length therebetween which is either permanently or adjustably attached to the float (104). The posterior end (302) of the water level rod (106) will be attached to the float (104). In the embodiment in which the attachment is adjustable, it is contemplated that the water level rod (106) will be attached to the float (104) at or near its posterior end (302). This flexible mode of attachment allows for the length of the water level rod (106) extending vertically from the float (104) to the top of the main body (103) to be changed and adjusted, thereby allowing a user to modify the flood water level at which a warming alarm would be activated. In one embodiment in which the form of attachment between the water level rod (106) and the float (104) is adjustable, the water level rod (106) will be attached to the float (104) via a washer and nut form of moveable attachment. Once the adjustable water level rod (106) is attached in this embodiment, the rod (106) will become stationary with regard to the float (104). Generally, the higher the float (104) is attached along the length of the adjustable water level rod (106), the higher a flood event that occurs will need to be to trigger the alarm.

The anterior end (301) of the water level rod (106) will be the portion of the device (101) that generally enacts the alarm assembly (108). Thus, depending upon the requirements needed for the activation of the alarm assembly (108) in a particular embodiment, the anterior end (301) of the water level rod (106) may be comprised of a metal cap or other metal connection device (if a circuit needs to be completed for alarm activation) or a plastic cap or finger (if a button or switch needs to be punched or switched for activation of the alarm assembly (108)). For example, in an embodiment of the device (101) where a circuit needs to be completed for the alarm to be activated, a metal cap will be located on the anterior end (301) of the water level rod (106). In this embodiment, as the flood waters rise and the float is raised along the length of the stabilizing rod (105) within the main body (103), the anterior end (301) of the of the water level rod (106) will correspondingly rise until the time at which the metal cap located at the anterior end (301) of the water level rod (106) comes into contact with an open circuit of the alarm assembly (108) and, upon contact, completes the circuit and activates the alarm assembly (108). Stated differently, in this embodiment the metal cap or tip of the water level rod (106) will connect the metal tabs allowing the circuit to complete, resulting in alarm activation.

In other embodiments where circuit completion is not required to activate the alarm, the rising flood waters will raise the anterior end (301) of the water level rod (106) to a point at which it comes into contact with a button, switch or some other activation methodology on the alarm assembly (108) which will, in turn, generally complete the circuit and activate the alarm system, notifying individuals in the surrounding area of the impending flood situation. In some embodiments of the device (101), the anterior end (301) of the water level rod (106) will have to travel through a grate, hole, slot or device of similar filtering and stabilizing construction prior to activating the alarm assembly (108) and to provide for a vertical movement without horizontal shifting which could result in the alarm not being triggered.

The purpose of this component of the device (101) will be to filter out debris or other refuge which could be located in the water and could short circuit, jam or otherwise impede the activation of the alarm assembly (108). Further, this component serves to stabilize the water level rod (106) prior to coming into contact with the activation methodology on the alarm assembly (108), stabilizing the rod (106) and preventing it from tipping sideways or otherwise missing the activation methodology. In these embodiments it is contemplated that the anterior end (301) of the water level rod (106) will be sized and shaped in such a manner so as to travel through the grate or other filtering structure without being impeded by the filter.

The final component of the disclosed device (101) is an alarm assembly (108). Generally, any known alarm assembly (108) which is capable of activation through mechanical means and emits a warning sign such as a sound or light when activated is contemplated in the device (101) described herein. For example, one contemplated alarm assembly (108) to be utilized in the device (101) is a commercial smoke alarm. In an alternative embodiment, the alarm assembly (108) can be designed to provide for a remote notification instead of a proximity notification. A sound or light alarm would generally be intended to notify a person in proximity to the device (101) of rising water. In such an alternative embodiment, the target user need not be in proximity and at bodily risk due to the rising water.

An example of an alternative alarm assembly (108) would be to have the alarm assembly (108), when triggered, communicate with a remote device. For example, the alarm assembly (108) may send a signal using any conventional wireless technology (including without limitation, Bluetooth™, Wi-Fi, Cellular, PCS, radio, microwave, optical laser, or any combination) to a remote location, which can then display an indication of the alarm condition. This could be, for example, the alarm assembly (108) calling a user's phone number, sending a text message, sending an email, or activating an alarm notice as part of a dedicated mobile device application ("app"). The alarm assembly (108) could alternatively or additionally notify a professional alarm service provider (such as a burglar alarm service company) of the alarm condition who could then respond and/or notify the user as the user desired.

A device (101) with a remote triggering alarm assembly (108) can be particularly useful to inhibit property damage when a user is not available to monitor potential water damage. Because the device (101) is preferably temporary, it can be used, for example, in a residence to monitor for potential flooding during a particularly rainy time of year, but removed when it is unlikely to be necessary. Similarly, it can be used to monitor crops or livestock that is near a river, lake, or other natural or manmade body of water which may be subject to flooding. For example, free range cattle may be herded into an area near a river as their current grazing location. The river could potentially be subject to flooding depending on conditions upstream which may be unknown to the owner of the livestock which could cause loss of some or all of the livestock if rising water is not detected quickly. Positioning a number of the devices (101) near the body of water could allow a remote rancher to detect the rising water and dispatch hands to move the livestock to higher ground should an alarm situation occur.

It should be apparent that the design of the device (101) can be particularly suited to this application. As the device (101) can be quite tall (2, 3, 4, 5 6, 7 or 8 or more feet tall) in an embodiment, the device can be sized and shaped so that it is easy to grasp a handle positioned on the anterior end (201) from horseback or from a moving utility or all-terrain vehicle (ATV). This can allow for the devices (101) to be easily placed in remote locations, and for them to potentially be recovered even if they are within rising waters.

As mentioned briefly previously in this application, regardless of the type of alarm generated, the alarm assembly (108) will generally be attached at or to the anterior (201) end of the main body (103). In one embodiment, the alarm assembly (108) will fit within the main body (103) near its anterior end (201). In another embodiment, the alarm assembly (108) will be permanently attached to the anterior end (201) of the main body (103) via an attachment methodology known to those of ordinary skill in the art. Further, in another embodiment, the alarm assembly (108) will be attached to the anterior end (201) of the main body (103) via a series of couplings and housings. For example, as shown in the embodiment depicted in FIGS. 1-4, the alarm assembly (108) will fit within about a 4 inch PVC collar and about a 4 inch threaded collar which are placed on about the 4 inch main body (103). In the embodiment of the device (101) in which a grate is utilized, the grate will be placed before the alarm assembly (108) (i.e., closer to the posterior end (202) of the main body (103)) between the PVC collar.

Alternative supplemental components of the disclosed device (101) which could be utilized in alternative embodiments include a door on the surface area of the main body (103) which would allow a user easy access to the internal portion of the main body (103) such that a user could easily adjust the height of the water level rod (106) and, thus, the height of rising water at which the alarm assembly (108) would be activated. Another supplemental component of the disclosed device (101) will be a threaded cap which will close off the top of the main body (103) and/or the housing and coupling attached to the anterior end (201) of the main body (103). In certain embodiments, the cap or lid may have an opening therein which would allow for water to leave the interior of the main body (103). It is also contemplated that in certain embodiments a handle mechanism will be attached to the device (101) to facilitate the movement of the device (101) from one location to another location in its portable embodiments. Depending upon the embodiment, this handle may be located on the side of the main body (103) or at the top of the main body (103) on the cap or lid. Another contemplated supplemental component in different embodiments is one or more oversized clamps that will connect the water level rod (106) and the stabilizing rod (105).

In some, the portable lightweight flood warning device (101) described herein is a lightweight reliable inexpensive flood warning device which solves many of the problems inherent to the devices of the prior art while retaining the ability to warn the occupants of a room, building or remote place of the damage of rising water before any equipment or goods are submerged in the flood, thereby saving lives and money. In particular, the device (101) described herein is distinguished from the float-based device of the prior art by its structure which isolates the electronics associated with the alarm assembly (108) and keeps them away from rising flood water and debris—protecting the device from the malfunctions that are currently associated with these devices in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A water alert system comprising:
   a plurality of alert devices for detecting rising water levels, each of the alert devices comprising:
   a weighted base plate;
   a main body having an anterior end and a posterior end, a length therebetween and a hollow interior, the posterior end of the main body being attached to the base plate and positioned approximately vertically therefrom;
   a stabilizing rod having an anterior end and a posterior end and a length therebetween, the posterior end of the stabilizing rod being attached to the base plate and extending approximately vertically therefrom into the interior of the main body;
   a float, the float being moveably attached to the stabilizing rod smaller in diameter than the main body;
   a water level rod having an anterior end and a posterior end and a length therebetween, the float being attached to the water level rod at or near its posterior end and the water level rod extending approximately vertically therefrom into the interior of the main body; and
   an alarm assembly located at or within the anterior end of the main body, the alarm assembly having an activation mechanism and configured to communicate with a remote device;
   wherein the activation mechanism of the alarm assembly is activated when rising water causes the float and the attached water level rod to rise approximately vertically along the path of the stabilizing rod within the main body until the anterior end of the water level rod comes into contact with the activation mechanism of the alarm assembly, thereby activating the alarm assembly; and
   a remote device disposed remotely from said alert devices;
   wherein when the activation mechanism is activated, the activation mechanism triggers an alarm at said remote device.

2. The system of claim 1 wherein the main body is perforated.

3. The system of claim 1 wherein the posterior end of the main body is attached to the base plate via an attachment methodology that creates a space between the posterior end of the main body and the base plate, thereby allowing for rising flood waters to enter and leave the hollow interior of the main body.

4. The system of claim 1 wherein the water level rod is adjustably attached to the float.

5. The system of claim 1 wherein at least one of the plurality of alert devices is portable.

6. The system of claim 5 wherein the portable alert device is further comprised of a handle, the handle being located somewhere on the external surface area of the portable alert device.

7. The system of claim 1 wherein at least one of the plurality of alert devices further comprises a door in the main body, the door allowing a user access to the hollow interior of the main body.

8. The system of claim 1 wherein the remote device receives a text message.

9. The system of claim 1 wherein the remote device receives an e-mail message.

10. The system of claim 1 wherein the remote device receives a phone call.

11. The system of claim 1 wherein the remote device is operated by a service company.

12. The system of claim 1 wherein the remote device comprises a mobile device.

13. The system of claim 1 wherein the remote device comprises a computer.

14. The system of claim 12 wherein said remote device interacts with a mobile device application on the mobile device.

15. The system of claim 1 wherein the remote device notifies a human user of the alarm.

* * * * *